Feb. 20, 1968 D. W. DOSS ET AL 3,370,177

CRYOELECTRIC SHIFT REGISTER

Filed Oct. 14, 1965

INVENTOR.
DWIGHT W. DOSS
JOHN W. BREMER
BY Samuel E. Turner
ATTORNEY 3,370,177

CRYOELECTRIC SHIFT REGISTER

Dwight W. Doss, Phoenix, Ariz., and John W. Bremer, Sunnyvale, Calif., assignors to General Electric Company, a corporation of New York Filed Oct. 14, 1965, Ser. No. 495,869
4 Claims. (Cl. 307—221)

This invention relates to a cryoelectric shift register and more particularly to such a register formed of superconductive circuits controlled by superconductive switches known as cryotrons.

The cryotron is now well-known and its construction and operation is described, for example, by John W. Bremer in a book entitled "Superconductive Devices," McGraw-Hill Book Company, Inc., New York, 1962. A schematic symbol of a cryotron is shown in FIG. 3.3, page 88, of the above Bremer publication. In accordance with this symbol and as used herein, the gate of a cryotron is represented by a circle and the control by a line crossing the circle. When a sufficient current is directed through the control of a cryotron the resulting magnetic field renders resistive the normally super conductive gate of the cryotron.

A shift register formed of superconductive circuits has previously been shown by V. L. Newhouse et al., in U.S. Patent No. 3,123,720, entitled "Cryogenic Shift Register" and assigned to the same assignee as the present invention.

It is the object of the present invention to provide an improved cryoelectric shift register having rapid operation and reduced fabrication space requirements.

These and other objects of the invention are achieved by providing a shift register wherein each stage thereof comprises first and second intercoupled superconductive loops, each loop including first, second and third alternate branches for an applied loop current. Four phases of shift current pulses are provided for each shift cycle of the register. Each branch of each loop of each stage of the shift register contains a cryotron. Input currents and shift current pulses are applied to the controls of the cryotrons in predetermined sequence whereby a value representing current may be transferred along the register.

Figure 1:
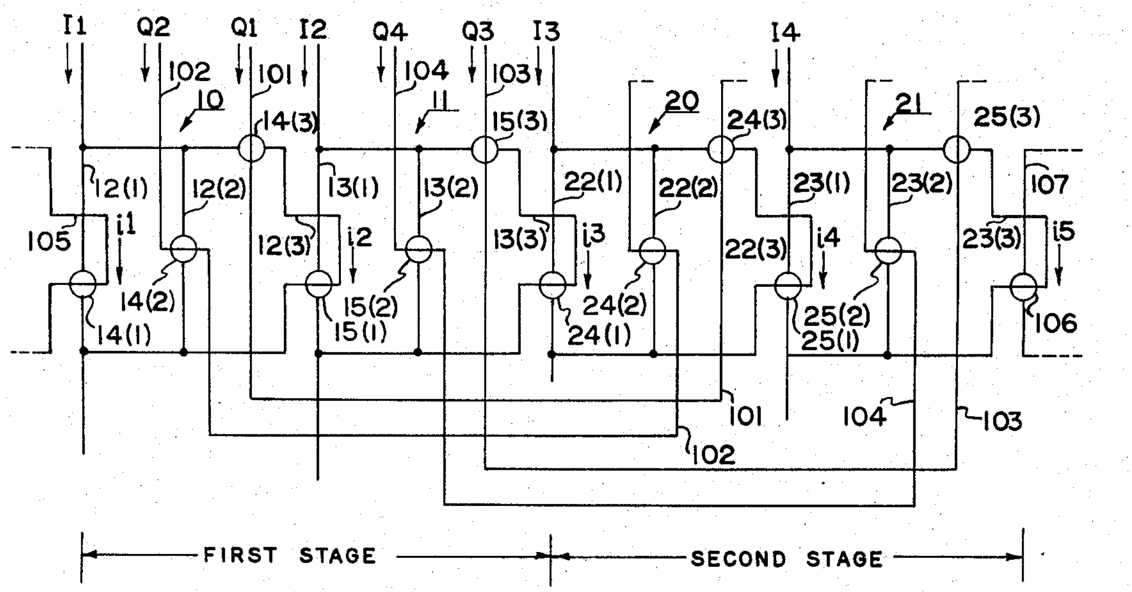
Figure 2:
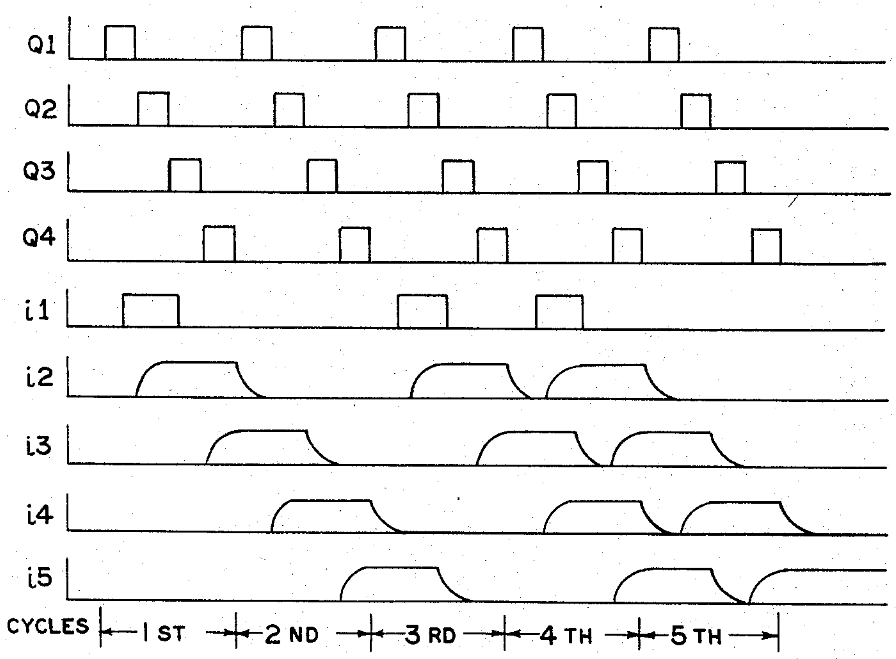

The invention is described more specifically hereinafter with reference to the accompanying drawing wherein:

FIGURE 1 is a schematic diagram of a two-stage shift register according to the invention; and FIGURE 2 is a timing diagram of current waveforms in illustration of an example of operation of the circuit of FIG. 1.

Two stages of a shift register according to the invention are shown in FIG. 1. The term "loop" as used throughout the specification is synonymous with the term "circuit." The first stage comprises first and second superconductive loops or circuits 10 and 11. The loop 10 comprises a first branch 12(1), a second branch 12(2) and a third branch 12(3). The loop 11 comprises a first branch 13(1), a second branch 13(2) and a third branch 13(3).

Similarly, the second illustrated stage is formed of first and second loops 20 and 21 comprising, respectively, first, second and third branches 22(1), 22(2) and 22(3) and first, second and third branches 23(1), 23(2) and 23(3).

Constant currents I1–I4 from a suitable source not shown are applied to loops 10, 11, 20 and 21, respectively, to provide the loop currents. (Alternatively these currents may be pulsed with currents I1 and I3 overlapping the first and second phases of the shift pulses Q1 and Q2 and with currents I2 and I4 overlapping the third and fourth shift pulses Q3 and Q4.)

A plurality of cryotrons 14(1)–14(3), 15(1)–15(3), 24(1)–24(3) and 25(1)–25(3) are provided to control the loop current flow in the circuit, the gate of each of these cryotrons being connected in a respective one of the branches of a respective one of the loops. The controls of cryotrons 14(3) and 24(3), 14(2) and 24(2), 15(3) and 25(3), and 15(2) and 25(2) are connected in respective lines 101–104 to receive sequential shift current pulses Q1–Q4 which constitute the four phases of each cycle of operation of the shift register.

The control of cryotron 14(1) is included in an input line 105. The line 105 may be the third branch of the second loop of a previous shift register stage or it may be a separate input line from other circuitry.

The controls of cryotrons 15(1), 24(1) and 25(1) are included in respective third branches of respective loops 10, 11 and 20. Similarly, the control of an output cryotron 106 is included in branch 23(3). The gate of cryotron 106 is connected in a line 107 which may constitute the first branch of a further stage of the register or which may be connected to other utilization circuitry.

To illustrate operation of the circuit, current flow in the controls of cryotrons 14(1), 15(1), 24(1), 25(1) and 106 are illustrated as respective currents *i*1–*i*5. In accordance with the usual convention the presence of a current is representative of a binary "1" while the absence of a current is representative of a binary "0."

Operation of the circuit is illustrated, by way of example, by the timing diagram of FIG. 2 which shows the circuit currents for five cycles of operation of the circuit during which the binary number "1011" is entered into the register as represented by an input current pulse *i*1 during the first cycle, the absence of the current *i*1 during the second cycle and the presence of current pulses *i*1 during the third and fourth cycles.

Also shown in FIG. 2 are the resulting currents *i*2–*i*5 in the circuit and the four phases of the applied shift current pulses Q1–Q4. (It is noted that the four phases of shift current pulses Q1–Q4 must occur in the sequence shown in FIG. 2 for each shift cycle; however, the cycles may be intermittent rather than continuous as shown.)

Operation of the circuit for the example illustrated in FIG. 2 is more specifically as follows:

Initially the loop currents I1–I4 are flowing in branches 12(1), 13(1), 22(1) and 23(1). Upon the occurrence of the input pulse *i*1 during the first cycle, the branch 12(1) is rendered resistive thereby driving the current I1 into the branch 12(2) since shift pulse Q1 renders branch 12(3) resistive. Next, the shift pulse Q2 drives branch 12(2) resistive thereby driving the current through branch 12(3) which is not resistive at this time since shift pulse Q1 has been removed and since branch 12(1) is maintained resistive by the input pulse *i*1. Therefore, the loop current is directed through branch 12(3) and through the control of cryotron 15(1) wherein it is illustrated as current *i*2.

During the third phase of the first shift cycle, branch 13(1) of loop 11 is therefore resistive due to the current *i*2 in the control of cryotron 15(1). The branch 13(3) is also resistive because of the shift current pulse Q3 in the control of cryotron 15(3). Therefore, the loop current I2 is directed through the second branch 13(2). During the fourth phase of the first cycle, the shift pulse current Q4 through the control of cryotron 15(2) renders the branch 13(2) resistive, however, the branch 13(3) is now superconductive and the loop current is diverted therethrough wherein it is illustrated as current *i*3. Thus at the end of a first cycle of operation, the presence of current *i*3 is representative of a "1" in the first stage while the absence of a current *i*5 is representative of a "0" (the initial state) in the second illustrated stage of the shift register.

The occurrence of the shift current pulse Q1 during the first phase of the second cycle renders the branch 12(3) of loop 10 resistive and diverts the loop current therefrom as shown in FIG. 2. There is an absence of current *i*1 during the second cycle to represent a "0" input value; therefore, the branch 12(1) remains superconductive. Thus upon the occurrence of the shift current pulse Q2 during the second phase of the second cycle the substantial portion of the loop current I1 is diverted through branch 12(1). It is noted that the branch 12(3) is also superconductive at this time. However, it is arranged that the third branches of each loop, such as branch 12(3), have substantially greater inductance than the first branches of each loop, such as the branch 12(1). For this reason the substantial portion of the loop current flows through the branch 12(1) even though the branch 12(3) is also superconductive in accordance with the principle that a current applied to parallel superconductive paths will divide therethrough in inverse proportion to the inductance thereof. (Alternatively, it is possible, although not desirable from the standpoint of resistive losses, to achieve diversion of the loop current into branch 12(1) by providing a slight overlap of the shift current pulses Q1 and Q2.) With the loop current directed through the branch 12(1), there is a continued absence of the current *i*2 to thus indicate the input of a "0" into the first stage of the register.

In the second stage, however, the branch 22(1) is resistive, due to the curent *i*3 and the loop current is directed through branch 22(3) during the second phase of the second cycle whereby the "1" in the first stage is transferred or shifted to the second stage as represented by the current *i*4. During the third and fourth phases of the second cycle this representation is shifted into the second loop 21 of the second stage wherein it is represented by the current *i*5.

Further operation of the circuit during the third, fourth and fifth cycles illustrated in FIG. 2 is believed readily apparent.

While the principles of the invention have been made clear in the illustrative embodiment, there will be obvious to those skilled in the art, many modfiications in structure, arrangement, proportions, the elements, materials and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A shift register comprising: a plurality of successive stages, each stage comprising first and second superconductive circuits, each circuit comprising first, second and third branches connected in parallel; means for applying a current to each of said circuits; a plurality of cryotrons, a respective cryotron having the gate thereof connected in each of said branches; said third branch of said first circuit containing the control of the cryotron in said first branch of said second circuit; and means for applying shift current pulses in sequence to the controls of the cryotrons in said third branches of said first circuits, to the controls of the cryotrons in said second branches of said first circuits, to the controls of the cryotrons in said third branches of said second circuits, and to the controls of the cryotrons in said second branches of said second circuits.

2. A shift register comprising: a plurality of successive superconductive circuits, each circuit including first, second and third branches connected in parallel; means for applying a current to each of said circuits; means responsive to a current in the third branch of a circuit for rendering resistive the first branch of the next successive circuit; and means for rendering resistive in succession the third branches of every other circuit, the second branches of said every other circuit, the third branches of circuits intermediate said every other circuits and the second branches of said circiuts intermediate said every other circuits.

3. A shift register comprising: a plurality of successive stages including an input stage and an output stage, each stage comprising first and second superconductive circuits and each circuit comprising first, second and third branches connected in parallel; a plurality of cryotrons, a respective cryotron having the gate thereof connected in each of said branches, said third branch adjacent a first branch of a next successive circuit containing the control of the cryotron in said first branch; an input line containing the control of the cryotron in said first branch of said first circuit of said input stage; an output line containing the gate of an output cryotron, said third branch of said second circuit of said output stage containing the control of said output cryotron; and means for applying shift current pulses to the controls of the cryotrons in said second and third branches of said first and second circuits of each stage in the following sequence: to the controls of the cryotrons in said third branches of said first circuits, to the controls of the cryotrons in said second branches of said first circuits, to the controls of the cryotrons in said third branches of said second circuits, and to the controls of the cryotrons in said second branches of said second circuits.

4. A shift register comprising: a plurality of successive superconductive circuits, each circuit including first, second and third branches connected in parallel, said third branches having substantially greater inductance than said first branches; means for applying a current to each of said circuits; means responsive to said current in the third branch of a circuit for rendering resistive the first branch of the next successive circuit; and means for rendering resistive in succession: the third branches of every other circuit, the second branches of said every other circuit, the third branches of circuits intermediate said every other circuits and the second branches of said circuits intermediate said every other circuits.

No references cited.

ARTHUR GAUSS, *Primary Examiner.*

J. ZAZWORSKY, *Assistant Examiner.*